United States Patent [19]
Hodulik et al.

[11] Patent Number: 5,161,239
[45] Date of Patent: Nov. 3, 1992

[54] RECORDING AND/OR REPRODUCING APPARATUS

[75] Inventors: Wolfgang Hodulik, Vienna; Henricus Ruyten, Gumpoldskirchen, both of Austria

[73] Assignee: U.S. Philips Corporation, New York, N.Y.

[21] Appl. No.: 842,783

[22] Filed: Feb. 26, 1992

Related U.S. Application Data

[63] Continuation of Ser. No. 570,246, Aug. 17, 1990, abandoned.

Foreign Application Priority Data

[30] Aug. 29, 1988 [AT] Austria .................. 2031/89

[51] Int. Cl.⁵ .................. G11B 33/02; G11B 17/02
[52] U.S. Cl. .................. 360/137; 360/97.01; 360/98.01; 369/75.1; 248/632
[58] Field of Search .................. 360/82, 83, 86, 87, 360/89, 90, 97.01, 98.01, 137; 369/75.1, 292; 248/638

[56] References Cited

U.S. PATENT DOCUMENTS

| | | | |
|---|---|---|---|
| 3,510,137 | 5/1970 | Freier | 248/638 |
| 4,632,356 | 12/1986 | Munz | 248/638 |
| 4,692,828 | 9/1987 | Noda et al. | 360/137 |
| 4,705,257 | 11/1987 | Leo et al. | 248/638 |
| 4,812,932 | 3/1989 | Hishinuma et al. | 360/98.01 |
| 4,912,580 | 3/1990 | Hanson | 369/75.1 |
| 4,937,771 | 6/1990 | Rumps, Jr. et al. | 369/75.1 |

Primary Examiner—Robert S. Tupper

[57] ABSTRACT

In a recording and/or reproducing apparatus (1) with a housing (7) and with a chassis (12) connected to a housing part (16), the chassis is connected to the housing part (16) via three connecting arrangements (13, 14, 15). Each connecting arrangement (13, 14, 15) has a supporting part (18, 19, 20) firmly connected to the housing part (16) and having a convex spherical supporting surface (21, 22, 23) facing the chassis (12), and a counterpart (24, 25, 26) connected to the chassis (12) and having a rotationally symmetrical, preferably like-wise spherical mating surface (27, 28, 29) which widens continuously towards the housing part (16). Of the three counterparts (24, 25, 26), two counterparts (24, 25) are connected to the chassis (12) in such a way that they can move relative to one another essentially in a predetermined direction (30) and the third counterpart (26) and the two other counterparts (24, 25) are connected to the chassis (12) in such a way that they can move both in a predetermined direction (30) and in a direction (32) perpendicular to the said direction (30).

12 Claims, 2 Drawing Sheets

RECORDING AND/OR REPRODUCING APPARATUS

This is a continuation of application Ser. No. 07/570,246, filed Aug. 27, 1990, now abandoned.

The invention relates to a recording and/or reproducing apparatus with a housing and with an essentially plate-shaped chassis which is provided for accommodating components of the apparatus and is connected via three connecting arrangements, arranged spaced apart in the manner of a three-point bearing, to a housing part extending at a distance from the chassis and parallel to the latter.

In the case of a commercially available known apparatus of the generic type stated above, the said device being a video recorder for recording and reproducing video and audio signals on or from a magnetic tape, each connecting arrangement has a fixing sleeve which is connected integrally to a housing base, projects on both sides from the latter, adjoining which, on one side, on the inside of the apparatus is the plate-shaped chassis and into which, on the other side, is inserted, from the outside of the apparatus, a distance sleeve which rests on the chassis with its end on the inside of the apparatus and, at its other end, facing away from the chassis, has a collar between which and the end, facing the latter, of the fixing sleeve an annular rubber plate for tolerance compensation is inserted and on which engages the screw head of a screw screwed through the distance sleeve into a bore in the chassis. Connecting arrangements of this kind are of relatively complicated construction, which requires a relatively complicated mounting procedure. Furthermore, a disadvantage is that moments may be transmitted, via such connecting arrangements from the housing base to the chassis during the connection of the chassis to the housing base as the screws are screwed into the bores of the chassis, due to the relative positions of the fixing sleeves and the bores in the chassis differing from one another owing to tolerances, and, after the chassis has been connected to the housing base, owing to different changes, for example temperature-dependent changes, in the dimensions of the housing and the chassis. This may result in a deformation, such as twisting or bending of the plate-shaped chassis, leading to a change in the position of the apparatus components attached to the chassis, this resulting in an impairment of or deterioration in the satisfactory functioning of the apparatus. However, it is particularly important, especially in the case of such a video recorder that the components interacting directly with the magnetic tape, such as tape guides, stationary magnetic heads and a drum-shaped scanning unit containing rotatingly drivable magnetic heads should always occupy the same position relative to one another because even slight changes in the position of these components can result in a disadvantageous deterioration in the quality of recording and reproduction.

It is the object of the invention to avoid the difficulties stated above and by simple means to ensure that no deformation of the chassis deriving from the housing can occur via the connecting arrangements during the connection of the chassis to the housing part and once the chassis has been connected to the housing part. For this purpose, the invention is characterized in that each of the three connecting arrangements has a supporting part, said supporting part being firmly connected to the housing part and having a convex spherical supporting surface facing the chassis, and a counterpart, said counterpart being connected to the chassis and having a rotationally symmetrical mating surface which widens continuously towards the housing part and with which the counterpart rests tiltably on the convex supporting surface, and in that two counterparts are connected to the chassis in such a way that they can move relative to one another essentially in a predetermined direction parallel to the plate-shaped chassis and in that the third counterpart and the two other counterparts are connected to the chassis in such a way that they can move relative to one another both essentially in a predetermined direction parallel to the plate-shaped chassis and essentially in a direction which is perpendicular to the said direction and parallel to the plate-shaped chassis. In this way it is ensured by particularly simple means that both during the connection of the chassis to the housing part and once the chassis has been connected to the housing part the counterparts can adapt their position on the chassis accurately to the position of the supporting parts on the housing part in a manner free from forces and moments and thus no transmission of moments from the housing to the chassis can occur via the connecting arrangements, with the result that no deformation of the chassis is possible. Consequently, no disadvantageous changes in the position of components attached to the chassis can occur, with the result that satisfactory functioning of the apparatus is guaranteed at all times. Furthermore, a simple mounting procedure for mounting the chassis is in this way achieved because the chassis can simply be placed by its counterparts essentially perpendicularly to its plate plane onto the supporting parts, the counterparts on the chassis adapting their position exactly to the position of the supporting parts on the housing part in a manner free from forces and moments. Such a mounting procedure can easily be mechanized, this being particularly favorable in terms of costs. Furthermore, an advantageous design with regard to economical producibility is achieved due to the particularly simple design of the connecting arrangements with a small number of component parts.

It should be mentioned that German Patent 2,522,270 discloses the connection of a first plate and a second plate, which are however both on the same level, via three bearings in such a way that, if the second plate is twisted, no forces deforming the first plate are transmitted to the first plate. In this arrangement, however, the bearings are of complicated construction, each of the three bearings having a ball element and a first counterpart, having the form of a hollow cone, for the ball element and one bearing furthermore having a second counterpart, having the form of a hollow cone, for the ball element and the two other bearings each having a second counterpart, formed by two guide rails, for the ball element. Bearings of this kind are difficult to produce and are therefore correspondingly expensive. Furthermore, when bearings of this kind are used, a complicated mounting procedure for mounting the first plate on the second plate is required. In contrast, in the case of the apparatus according to the invention the connecting arrangements for connecting the plate-shaped chassis and the housing part extending at a distance from the plate-shaped chassis and parallel to it have a particularly simple construction with a particularly small number of component parts, this being advantageous with regard to economical producibility, and a simple assembly procedure for mounting the chassis on the housing part is furthermore achieved.

In the case of an apparatus according to the invention, two counterparts can be connected to the chassis in such a way that they can move relative to one another in a first direction and the third counterpart and the two other counterparts can be connected to the chassis in such a way that they can move relative to one another in a second direction and in the direction perpendicular to this second direction. However, it has proven advantageous if two counterparts are connected to the chassis in such a way that they can only move essentially in the direction of a connecting line between these two counterparts and the third counterpart is connected to the chassis in such a way that it can only move essentially in a direction perpendicular to the direction of this connecting line. This is advantageous with regard to as simple a design as possible of the movable connection of all three counterparts to the chassis, it being possible to provide the same design of the movable connection for all three counterparts.

However, it has also proven advantageous if one counterpart is connected immovably to the chassis and one counterpart is connected to the chassis in such a way that it can move essentially in the direction of a connecting line between it and the counterpart immovably connected to the chassis, and the third counterpart is connected to the chassis in such a way that it can move both essentially in the direction of this connecting line and essentially in a direction perpendicular to the direction of this connecting line. It is thereby advantageously achieved that only two of the three counterparts are connected to the chassis in such a way that they can move and one counterpart is simply connected immovably, i.e. firmly, to the chassis and that the connecting arrangement which has the counterpart firmly connected to the chassis forms a fixed reference point for the positioning of the chassis relative to the housing part.

For connecting the movable counterparts movably to the chassis, the counterparts concerned can have arms projecting from them which are rigid in all directions and are mounted pivotably on the chassis by their free ends. However, it has proven particularly advantageous if, for connecting the movable counterparts movably to the chassis, the movable counterparts have arms projecting from them which are designed to be rigid in the direction of their longitudinal extension and to be resiliently flexible in the direction transverse to their longitudinal extension and are firmly connected by their free ends to the chassis. This is advantageous with regard to a simple design and a simple connection to the chassis. In this arrangement, the counterparts, including their arms, can consist of plastic and the counterparts or their arms can be connected in a particularly advantageous manner to the chassis by the outsert moulding technique.

The counterparts can only rest with their mating surfaces on the supporting surfaces of the supporting parts under the action of the weight of the chassis and of the components attached to the chassis, the chassis then being connected securely to the housing part via the connecting arrangements for only a limited range of the spatial position of the apparatus however. It has therefore proven advantageous if each connecting arrangement has a screw which passes through an opening in the chassis and an opening essentially coaxial to the latter in the counterpart connected to the chassis and is screwed into a bore in the supporting part, and a spring element which is supported on the screw head of the screw, engages on the chassis and loads the latter resiliently towards the supporting part, the counterpart connected to the chassis being held resting with its mating surface against the supporting surface of the supporting part by the force of the spring element. In this way, a secure connection of the chassis to the housing part via the three connecting arrangements is ensured at all times irrespective of the spatial position of the apparatus, said connection not transmitting any moments.

In this arrangement, it has proven particularly advantageous if the supporting part has a sleeve which is coaxial to the bore, projects from it, is passed through the openings in the counterpart and in the chassis and on the free end of which the screw head is supported with the interposition of the spring element. In this way, the screwing-in depth for the screw is determined by the sleeve and the force exerted on the chassis by the spring element supported on the screw head is fixed at a constant value determined by the screwing-in depth set.

The mating surfaces of the counterparts can, for example, have the form of a hollow cone. It has proven particularly advantageous, however, if the mating surfaces of the counterparts are of spherical design. An exact adaptation of the spatial position of the counterparts to the spatial position of the supporting parts is thereby achieved for a relatively large tilting range of the counterparts.

The invention is described in greater detail below with reference to two exemplary embodiments illustrated in the drawings, although there is no intention to restrict the invention to said exemplary embodiments.

Figure 1:
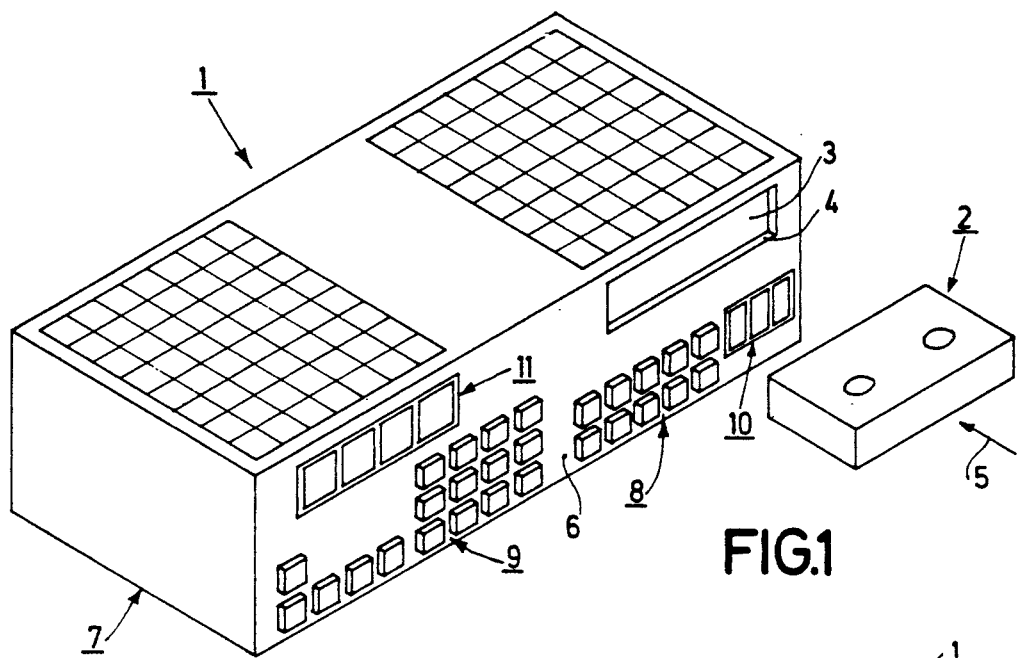
FIG. 1 shows diagrammatically on a reduced scale and in an oblique view a recording and reproducing apparatus for television signals and audio signals into which can be inserted a cassette which contains a magnetic tape and, which television signals can be recorded in helical tracks or reproduced from it with the aid of rotatingly drivable magnetic heads.

FIG. 1 shows a recording and reproducing apparatus 1 which is designed for recording and reproducing television signals and audio signals on a magnetic tape and is customarily referred to for short as a video recorder. The magnetic tape is accommodated in a cassette 2 which is illustrated diagrammatically in FIG. 1. The cassette 2 can be inserted into the apparatus 1 by hand, in the direction of the arrow 5, through an opening 4 which can be closed by a cover 3 pivotable into the interior of the apparatus. The opening 4 is provided in a front wall 6 of the housing 7 of the apparatus 1. As the cassette 2 is inserted into the apparatus 1, it is pushed into a displaceable cassette holder by means of which the cassette, after being inserted fully into said cassette holder, is lowered in the apparatus essentially perpendicularly to the cassette main walls into an operating position. In this operating position, the cassette is positioned in its position with the aid of positioning pins on the apparatus, and displaceable tape guides by means of which the magnetic tape can be guided out of the cassette enter the cassette, the magnetic tape being brought into active connection with stationary tape guides, stationary magnetic heads and a drum-shaped, rotatingly drivable scanning unit containing magnetic heads, all in the apparatus. For switching on operating modes of the apparatus 1, such as "record", "playback, normal forward running", "freeze frame", "high-speed forward playback", "high-speed reverse playback", "fast forward", "fast rewind" and the like, the apparatus 1 has on its housing front wall 6 a first set 8 of buttons. For programming the apparatus 1 and for inputting further data, for example for setting a clock or for setting a preprogrammable start time, the apparatus 1 has a second set 9 of buttons on its housing front wall 6. The apparatus 1 furthermore has on its housing front wall 6 two display units 10 and 11, whose display elements are each made up, for example, of seven segments and serve, for example, to display counter readings of a counter for measuring the tape used and for displaying times of day.

The abovementioned positioning pins for positioning a cassette 2 in its operating position in the apparatus and the displaceable tape guides, the stationary tape guides, the stationary magnetic heads, the drum-shaped scanning unit and a multiplicity of other components of the apparatus 1 are mounted on an essentially plate-shaped chassis 12 of the apparatus 1. This chassis 12 is illustrated diagrammatically in FIG. 2, the abovementioned components and other bores, openings, reinforcing ribs or reinforcing beads and the like also provided on the chassis 12 not having been illustrated for the sake of simplicity. In the present case, the chassis 12 consists of steel but can also be designed as an aluminium die casting.

The chassis 12 is connected via three connecting arrangements 13, 14 and 15, arranged spaced apart in the manner of a three-point bearing to the base 16 of the housing 7, the said base extending at a distance from the chassis 12 and parallel to the latter. Of the housing 7 of the apparatus 1, the housing rear wall 17 is also indicated in section in FIG. 2, in addition to the base 16.

Figure 2:
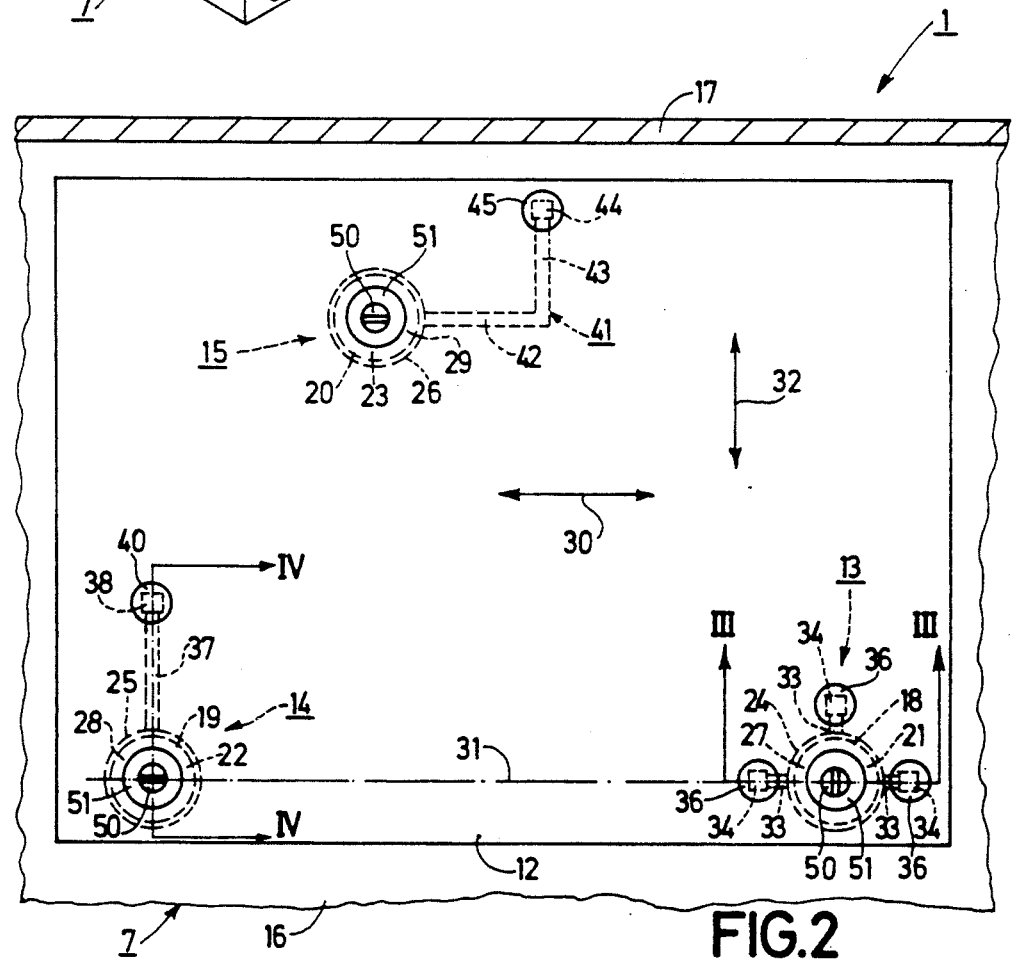
FIG. 2 shows diagrammatically in plan view and partially in section a part of the apparatus according to FIG. 1, said part having a plate-shaped chassis which is connected by means of three connecting arrangements to the base of the housing of the apparatus according to FIG. 1.
Figure 3:
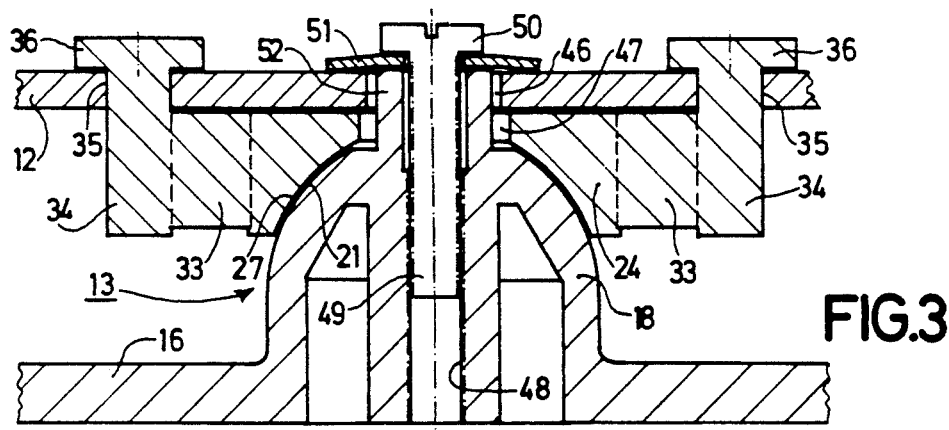
FIG. 3 shows, in a section along the line III—III in FIG. 2, one of the three connecting arrangements of the apparatus according to FIGS. 1 and 2.
Figure 4:
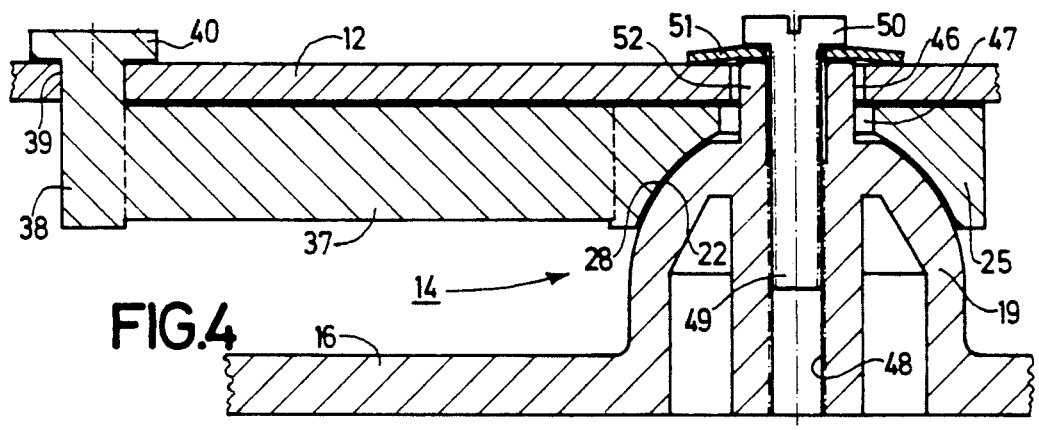
FIG. 4 shows, in a section along the line IV—IV in FIG. 2, another of the three connecting arrangements of the apparatus according to FIGS. 1 and 2.

As can be seen from FIGS. 2, 3 and 4, each of the three connecting arrangements 13, 14 and 15 has a supporting part 18, 19 and 20 respectively, firmly connected to the base 16. In the present case, the supporting parts 18, 19 and 20 and the base 16 are of integral construction, the base 16 and the supporting parts 18, 19 and 20 consisting of plastic. However, the supporting parts 18, 19 and 20 could also be designed as separate parts, screwed fast to the base of the housing for example Each of the three supporting parts 18, 19 and 20 is essentially of cupola-shaped design and has a convex spherical supporting surface 21, 22 and 23 respectively, facing the chassis 12. The supporting parts need not have a closed cupola shape but could also comprise arcuate ribs offset at a uniform angle to one another, all the ribs of a supporting part together producing a convex spherical supporting surface.

Each of the three connecting arrangements 13, 14 and 15 furthermore has a counterpart 24, 25 and 26, respectively, connected to the chassis 12 and having a rotationally symmetrical mating surface 27, 28 and 29, respectively, widening constantly towards the base 16. With its mating surface 27, 28 and 29, respectively, each counterpart 24, 25 and 26, respectively, rests tiltably on the convex supporting surface 21, 22 and 23, respectively, of the relevant supporting part 18, 19 and 20, respectively. In the present case, the mating surfaces 27, 28 and 29, respectively, of the counterparts 24, 25 and 26 are also of spherical design thereby achieving a relatively large tilting range for the counterparts relative to the supporting parts. However, the mating surfaces could also have the shape of a hollow cone or of a paraboloid.

Of the three counterparts 24, 25 and 26, two counterparts, namely the two counterparts 24 and 25, are connected to the chassis 12 in such a way that they can move relative to one another, essentially in a predetermined direction, indicated by a double arrow 30, parallel to the plate-shaped chassis 12, the predetermined direction 30 in this case coinciding with the direction of a connecting line 31 between the two counterparts 24 and 25, although this need not be the case. For this purpose, one of the two counterparts 24 and 25, namely counterpart 24, is in the present case connected immovably to the chassis 12 and the other counterpart 25 is connected to the chassis 12 in such a way that it can only move essentially in the direction 30 of the connecting line 31 between counterpart 25 and the counterpart 24 connected immovably to the chassis. Furthermore, the third counterpart 26 and the two other counterparts 24 and 25 are connected to the chassis 12 in such a way that they can move relative to one another essentially both in a predetermined direction parallel to the plate-shaped chassis 12, said direction corresponding in this case to the direction indicated by the double arrow 30, and essentially in a direction perpendicular to this direction 30, parallel to the plate-shaped chassis 12 and indicated by a double arrow 32. For this purpose, the third counterpart 26 is in the present case connected to the chassis 12 in such a way that it can move both essentially in the direction 30 of connecting line 31 and essentially in the direction 32 perpendicular to the direction 30 of connecting line 31. All three counterparts 24, 25, and 26 consist of plastic and are connected to the chassis 12 by the outsert molding technique.

For the purpose of connecting counterpart 24 immovably to the chassis 12, counterpart 24 has three laterally protruding plastic arms 33 integrally connected to it, at each of the free ends of which there is provided a peg 34 of square cross-section which protrudes through an opening 35, of correspondingly square cross-section, in the chassis 12 and at its end protruding through the chassis 12 is terminated by a head 36 of circular cross-section. The counterpart 24 and the arms 33 rest against the chassis 12 by those of their boundary surfaces which face away from the supporting part 18.

For connecting counterpart 25 movably to the chassis 12, counterpart 25 has an arm 37 which is connected integrally to it, projects laterally from it in direction 32, consists of plastic, is designed to be rigid in the direction of its longitudinal extension and to be resiliently flexible transversely to its longitudinal extension, and is rigidly connected by its free end to the chassis 12. For this purpose, a peg 38 of square cross-section is provided at the free end of the arm 37, said peg protruding through an opening 39, of correspondingly square cross-section, in the chassis 12 and being terminated at its end protruding through the chassis 12 by a head 40 of circular cross-section. The counterpart 25 and the arm 37 rest against the chassis 12 by those of their boundary surfaces which face away from the supporting part 19.

For connecting the third counterpart 26 movably to the chassis 12, counterpart 26 has an arm 41 which is connected integrally to it, projects laterally from it, consists of plastic, is likewise designed to be rigid in the direction of its longitudinal extension and to be resiliently flexible transversely to its longitudinal extension, and is rigidly connected by its free end to the chassis 12. The arm 41 here has an L-shaped angle and has an arm section 42 extending in the direction 30 of the connecting line 31 and an arm section 43 extending in the direction 32 perpendicular to the connecting line 31. In this way, counterpart 26 is connected to the chassis 12 in such a way that it can move relative to the other two counterparts 24 and 25 both in direction 30 and in the direction 32 perpendicular to the latter. At the free end of arm section 43 of the arm 41 there is likewise provided a peg 44 of square cross-section which protrudes through an opening, of correspondingly square cross-section, in the chassis 12 and is terminated at its end protruding through the chassis 12 by a head 45 of circular cross-section. The counterpart 26 and the arm 41 rest against the chassis 12 by those of their boundary surfaces which face away from the supporting part 20.

Each connecting arrangement 13, 14 and 15, respectively, has a screw 49 passing through an opening 46 in the chassis 12 and an opening 47, essentially coaxial to the latter opening, in the counterpart 24, 25 and 26, respectively, connected to the chassis 12 and screwed into a bore 48 in the supporting part 18, 19 and 20, respectively, and a spring element 51 supported on the screw head 50 of the screw 49. The spring element 51 is here designed as a Belleville spring but could, for example, also be designed as a helical compression spring. The spring element 51 engages on the chassis 12 and loads the chassis 12 resiliently towards the supporting part 18, 19 and 20, respectively, the counterpart 24, 25 and 26, respectively, connected to the chassis 12 and resting against the chassis 12 being held with its mating surface 27, 28 and 29, respectively, against the supporting surface 21, 22 and 23, respectively, of the supporting part 18, 19 and 20 by the force of the spring element 51. In this arrangement, each supporting part 18, 19 and 20 has a sleeve 52 which is coaxial to the bore 48, projects from it, is passed through the openings 47 and 46 in the counterpart 24, 25 and 26, respectively, and in the chassis 12 and on the free end of which, which protrudes somewhat above the level of the chassis, the screw head 50 is supported with the interposition of the spring element 51.

To mount the chassis 12 on the base 16 of the housing 7 of the apparatus 1, the chassis 12 is simply placed by its counterparts 24, 25 and 26 onto the supporting parts 18, 19 and 20 perpendicularly to the plane of its plate, this advantageously being accomplished in a mechanized operation. During this procedure, connecting arrangement 13, which has the counterpart 24 firmly connected to the chassis 12, forms a fixed reference point for the positioning of the chassis 12 relative to the base 16 of the housing 7 of the apparatus 1. Since they are connected to the chassis 12 in the way described above such that they can move relative to the counterpart 24 and relative to one another, the counterparts 25 and 26 of the two other connecting arrangements 14 and 15 can adapt their spatial position without forces and without moments to the position of the relevant supporting parts 19 and 20, with the result that as the counterparts 24, 25 and 26 are placed on the supporting parts 18, 19 and 20, no moments are transmitted to the chassis 12 and hence no deformation of the chassis 12 can occur. After the counterparts 24, 25 and 26 have been placed on the supporting parts 18, 19 and 20, the screws 49, after prior placement of the spring elements 51, are screwed into the bores 48, this likewise advantageously being accomplished in a mechanized operation. The screws 49 are screwed in until the screw heads 50, with the interposition of the spring elements 51, are supported on the free ends of the sleeves 52 of the supporting parts 18, 19 and 20. In this way, a reliable connection, which does not transmit any moments, of the chassis 12 to the base 16 of the housing 7 is always ensured via the three connecting arrangements 13, 14 and 15, irrespective of the spatial position of the apparatus 1. Since the screw heads 50 are supported on the free ends of the sleeves 52 with the interposition of the spring elements 51, the depth to which the screws 49 are screwed in is precisely determined and therefore the forces exerted on the chassis 12 by the spring elements 51 supported on the screw heads 50 are set to constant values by the depth of screwing-in set. Due to the above-described design of the three connecting arrangements 13, 14 and 15, the counterparts 24, 25 and 26 can always adapt their position to the position of the supporting parts 18, 19 and 20 without moments even when the chassis 12 is already connected to the base 16, with the result that no deformation of the chassis 12 can occur. This is important for the compensation of different temperature-dependent dimensional changes in the housing base 16 and in the chassis 12 connected to the latter. Since, as mentioned, no deformation of the chassis 12 can occur either during the mounting of the chassis 12 on the housing base 16 nor when the chassis 12 is already connected to the housing base 16, it is achieved that the components provided on the chassis 12 always remain in the same position relative to one another, satisfactory functioning of the apparatus 1 thereby being guaranteed at all times. This is of great importance particularly in the case of a video recorder since, in the case of such an apparatus, even slight changes in the position of, for example, the tape guides relative to the drum-shaped scanning unit or relative to the stationary magnetic heads lead to noticeable losses in quality or to disturbances, for example, in the reproduction of the television signals.

Figure 5:
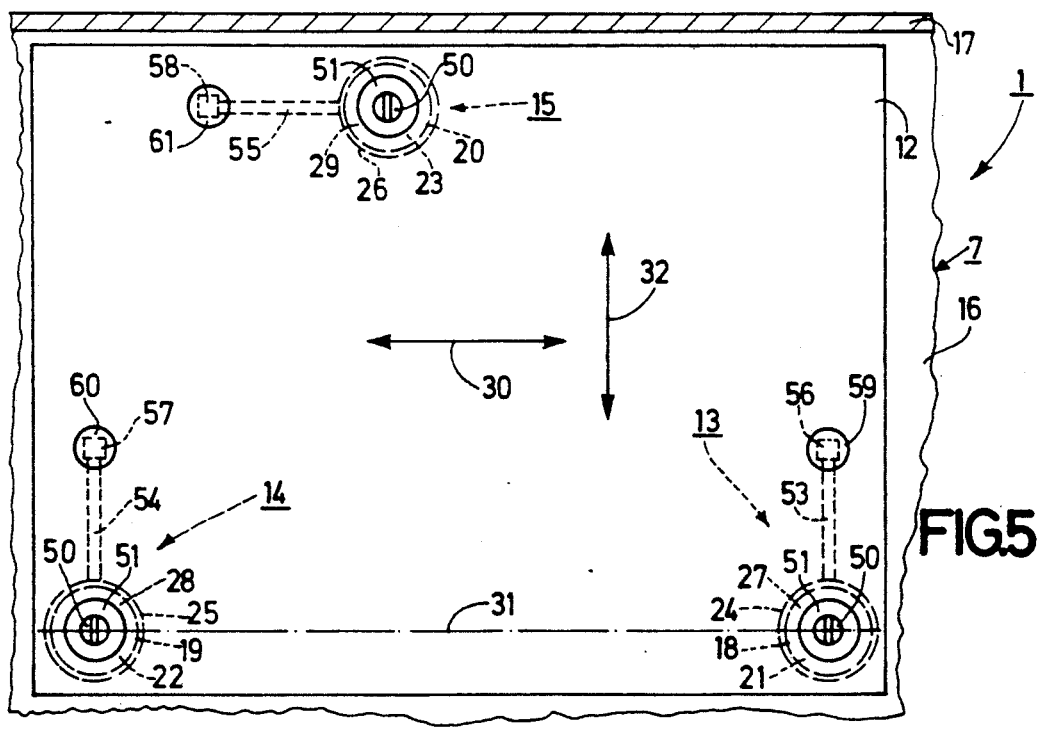
FIG. 5 shows, in a manner similar to FIG. 2, part of a further apparatus, which has a plate-shaped chassis which is likewise connected to the base of the housing of this apparatus by means of three connecting arrangements.

FIG. 5 shows a recording and reproducing apparatus 1 in accordance with another exemplary embodiment, the plate-shaped chassis 12 of which is connected to the base 16 of the housing 7 of the apparatus 1 via three connecting arrangements 13, 14 and 15. Each of these three connecting arrangements 13, 14 and 15 likewise has a supporting part 18, 19 and 20, respectively, having a convex, spherical supporting surface 21, 22 and 23, respectively, facing the chassis 12, and a counterpart 24, 25 and 26, respectively, connected to the chassis 12 and having a rotationally symmetrical, spherical mating surface 27, 28 and 29, respectively, which widens continuously towards the base 16.

In the case of the apparatus according to FIG. 5, two counterparts, namely the two counterparts 24 and 25 are connected to the chassis 12 in such a way that they can only move essentially in the direction 30 of a connecting line 31 between these two counterparts 24 and 25 and the third counterpart 26 is connected to the chassis 12 in such a way that it can only move essentially in a direction 32 perpendicular to the direction 30 of this connecting line 31.

For connecting the three counterparts 24, 25 and 26 movably to the chassis 12, each of the three counterparts has an arm 53, 54 and 55, respectively, integrally connected to it, projecting laterally from it and consisting of plastic. The free ends of the arms 53, 54 and 55 are connected rigidly to the chassis 12 in the same way as in the case of the apparatus according to FIGS. 1 to 4 via square pegs 56, 57 and 58 having circular heads 59, 60 and 61. The arms 53, 54 and 55 are designed to be rigid in the direction of their longitudinal extension and resiliently flexible in the direction transverse to their longitudinal extension. The arms 53 and 54 of the two counterparts 24 and 25 extend in the direction 32 perpendicular to the connecting line 31 between the two counterparts 24 and 25, with the result that these two counterparts 24 and 25 are connected to the chassis 12 in such a way that they can move relative to one another essentially in the direction 30 of the connecting line 31. The arm 55 of the third counterpart 26 extends in the direction 30 of the connecting line 31, with the result that the third counterpart 26 and the two other counterparts 24 and 25 are connected to the chassis 12 in such a way that they can move relative to one another both essentially in the direction 30 of the connecting line 31 and essentially in the direction perpendicular to the direction 30 of the connecting line 31.

Just as in the case of the apparatus according to FIGS. 1 to 4, in the case of the apparatus according to FIG. 5, each connecting arrangement 13, 14 and 15, respectively, has a screw which passes through an opening in the chassis 12 and an opening, essentially coaxial to the latter, in the counterpart 24, 25 and 26, respectively, connected to the chassis 12 and is screwed into a bore in the supporting part 18, 19 and 20, respectively, and a spring element 51 supported on the screw head 50 of the screw.

In the case of the device according to FIG. 5 too, the above-described design of the three connecting arrangements 13, 14 and 15 guarantees that no deformation of the chassis 12 can occur either during the connection of the chassis 12 to the base 16 of the housing 7 or after the chassis 12 has been connected to the base 16, with the result that no changes in the relative positions between the components provided on the chassis can occur and satisfactory functioning of the apparatus is therefor guaranteed at all times.

The invention is not limited to the exemplary embodiments described above. Thus, instead of the arms designed to be resiliently flexible over their entire length in a direction transverse to their longitudinal extension, for connecting the movable counterparts movably to the chassis, arms which are rigid in all directions but are provided with film hinges could also be provided. The invention can be employed with advantage not only in the case of video recorders as described above but, for example, also in the case of other recording and/or reproducing apparatuses, such as compact disc players and magnetic tape recorders for recording and reproducing analog or digital audio signals.

We claim:

1. A recording and/or reproducing apparatus with a housing and with an essentially plate-shaped chassis which is provided for accommodating components of the apparatus that is connected by three connecting arrangements to a housing part extending a distance from the chassis and essentially parallel to said chassis, said connecting arrangements being arranged spaced apart in the manner of a three-point bearing, characterized in that:

each of the three connecting arrangements has a supporting part, each said supporting part being firmly connected to the housing part and having a convex spherical supporting surface facing the chassis, and a respective counterpart, one of said counterparts being connected to the chassis and having a rotationally symmetric mating surface which widens continuously toward the housing part, said one counterpart interacting tiltably with one of said convex spherical supporting surfaces; the two additional ones of said counterparts being connected to the chassis in such a way that movement between said two additional counterparts can take place relative to one another essentially in a first predetermined direction parallel to the plate-shaped chassis, and in that said one counterpart and said two additional counterparts are connected to the chassis in such a way that movement therebetween can take place relative to one another essentially in said predetermined direction parallel to the plate-shaped chassis, said one counterpart also being capable of movement relative to said to additional counterparts essentially in a direction which is perpendicular to said first predetermined direction and parallel to the plate-shaped chassis.

2. Apparatus according to claim 1, characterized in that said two additional counterparts are connected to the chassis in such a way that relative movement can take place between them essentially in the direction of a connecting line between those two counterparts and said one counterpart is connected to the chassis in such a way that it can move essentially in a direction perpendicular to the direction of this connecting line.

3. Apparatus according to claim 1, characterized in that a first one of said two additional counterparts is connected immovably to the chassis and the second of said two additional counterparts is connected to the chassis in such a way that it can move essentially in the direction of a connecting line between it and the counterpart immovably connected to the chassis, and in that said one counterpart is connected to the chassis in such a way that it can move both essentially in the direction of this connecting line and essentially in a direction perpendicular to the direction of this connecting line.

4. Apparatus according to claim 3, characterized in that for connecting the movable counterparts movably to the chassis, the movable counterparts have arms projecting from them which are designed to be rigid in the direction of their longitudinal extension and to be resiliently flexible in the direction transverse to their longitudinal extension and are firmly connected by their free ends to the chassis.

5. Apparatus according to claim 4, characterized in that each connecting arrangement has a screw which passes through an opening in the chassis and an opening essentially coaxial to the latter in the counterpart connected to the chassis and associated with the supporting part of a respective one of said connecting arrangements, each said screw being screwed into a bore in an associated supporting part, and a spring element which is supported on the screw head of the screw and which engages on the chassis and loads the latter resiliently toward its associated supporting part, each counterpart connected to the chassis being held resting with a surface against the associated supporting surface of the supporting part by the force of its associated spring element.

6. Apparatus according to claim 5, characterized in that each supporting part has a sleeve which is coaxial to its associated bore and projects from it and is passed through the openings in its associated counterpart and in the chassis and on the free end of which the screw head is supported with the interposition of its associated spring element.

7. Apparatus according to claim 6, characterized in that the mating surfaces of the counterparts are of spherical design.

8. Apparatus according to claim 2, characterized in that a first of said two additional counterparts is connected immovably to the chassis and the second of said two additional counterparts is connected to the chassis in such a way that it can move essentially in the direction of a connecting line between it and the counterpart immovably connected to the chassis, and in that said one counterpart is connected to the chassis in such a way that it can move essentially in a direction perpendicular to the direction of this connecting line.

9. Apparatus according to claim 8, characterized in that for connecting the movable counterparts movably to the chassis, the movable counterparts have arms projecting from them which are designed to be rigid in the direction of their longitudinal extension and to be resiliently flexible in the direction transverse to their longitudinal extension and are firmly connected by their free ends to the chassis.

10. Apparatus according to claim 9, characterized in that each connecting arrangement has a screw which passes through an opening in the chassis and an opening essentially coaxial to the latter in the counterpart connected to the chassis and associated with the supporting part of a respective one of said connecting arrangements, each said screw being screwed into a bore in an associated supporting part, and a spring element which is supported on the screw head of the screw and which engages on the chassis and loads the latter resiliently toward its associated supporting part, each counterpart connected to the chassis being held resting with a surface against the associated supporting surface of the supporting part by the force of its associated spring element.

11. Apparatus according to claim 10, characterized in that each supporting part has a sleeve which is coaxial to its associated bore and projects from it and is passed through the openings in its associated counterpart and in the chassis and on the free end of which the screw head is supported with the interposition of its associated spring element.

12. Apparatus according to claim 11, characterized in that the mating surfaces of the counterparts are of spherical design.

* * * * *